US009511562B2

(12) United States Patent
Kruckenberg et al.

(10) Patent No.: US 9,511,562 B2
(45) Date of Patent: Dec. 6, 2016

(54) NANOREINFORCED FILMS AND LAMINATES FOR AEROSPACE STRUCTURES

(75) Inventors: Teresa May Kruckenberg, La Mesa, CA (US); Vijay V. Pujar, San Diego, CA (US); Anthony M. Mazany, Amelia Island, FL (US)

(73) Assignees: ROHR, INC., Chula Vista, CA (US); GOODRICH CORPORATION, Charlotte, NC (US)

( * ) Notice: Subject to any disclaimer, the term of this patent is extended or adjusted under 35 U.S.C. 154(b) by 411 days.

(21) Appl. No.: 13/541,028

(22) Filed: Jul. 3, 2012

(65) Prior Publication Data

US 2014/0011414 A1 Jan. 9, 2014

(51) Int. Cl.

| | |
|---|---|
| *B32B 5/16* | (2006.01) |
| *B64C 3/20* | (2006.01) |
| *B32B 5/24* | (2006.01) |
| *B64C 27/473* | (2006.01) |

(Continued)

(52) U.S. Cl.
CPC . *B32B 5/16* (2013.01); *B32B 5/24* (2013.01); *B64C 3/20* (2013.01); *B32B 2260/023* (2013.01); *B32B 2307/20* (2013.01); *B32B 2307/71* (2013.01); *B32B 2605/18* (2013.01); *B64C 2001/0072* (2013.01);

(Continued)

(58) Field of Classification Search
CPC .................... B32B 2260/023; B32B 2307/20; B32B 2307/71; B32B 2605/18; B32B 5/16; B32B 5/26; B32B 5/30; B64C 2001/0054; B64C 2001/0072; B64C 2001/0081; B64D 45/02; C08J 5/005; D06M 5/15; D06M 2101/40; D06N 3/12; D06N 3/0011; B82Y 30/00; B82Y 35/00

USPC ......... 428/299.1, 323; 244/1 A; 442/59, 110, 442/111, 117
See application file for complete search history.

(56) References Cited

U.S. PATENT DOCUMENTS

| | | | |
|---|---|---|---|
| 2009/0092844 A1 | 4/2009 | Ware et al. | |
| 2009/0140098 A1* | 6/2009 | Lengsfeld | B64D 45/02 244/121 |

(Continued)

FOREIGN PATENT DOCUMENTS

| | | |
|---|---|---|
| DE | 102006046002 | 4/2008 |
| EP | 2289803 | 3/2011 |

(Continued)

OTHER PUBLICATIONS

Extended European Search Report dated Oct. 9, 2013 in European Application No. 13174790.9.

(Continued)

*Primary Examiner* — Jennifer A Steele
(74) *Attorney, Agent, or Firm* — Snell & Wilmer, L.L.P.

(57) ABSTRACT

A composite laminate for use on an external part of an aerospace vehicle has improved ultraviolet resistance and resistance to microcracking from thermal cycling. The laminate comprises a nanoreinforcement film, a support veil, and a composite layer. The laminate also can have a lightning strike protection layer and an external paint and primer. The nanoreinforcement film can comprise carbon nanomaterial and a polymer resin, and the composite layer has one or more layers of a reinforcement and a polymer resin. The carbon nanomaterial can be carbon nanofibers, and the nanoreinforcement film can have an areal weight of less than about 100 g/m2. The carbon nanomaterial can also comprise carbon nanofibers and carbon nanotubes.

12 Claims, 5 Drawing Sheets

(51) Int. Cl.
  *B64D 45/02* (2006.01)
  *B64C 1/00* (2006.01)

(52) U.S. Cl.
  CPC ...... *B64C 2027/4736* (2013.01); *B64D 45/02* (2013.01); *Y02T 50/433* (2013.01); *Y10T 428/249921* (2015.04); *Y10T 428/273* (2015.01); *Y10T 442/30* (2015.04); *Y10T 442/40* (2015.04); *Y10T 442/60* (2015.04)

(56) References Cited

U.S. PATENT DOCUMENTS

2009/0227162 A1* 9/2009 Kruckenberg et al. ............ 442/1
2011/0049292 A1* 3/2011 Kruckenberg et al. ....... 244/1 A
2011/0281034 A1 11/2011 Lee et al.

FOREIGN PATENT DOCUMENTS

GB 2433467 6/2007
WO 2008048705 4/2008

OTHER PUBLICATIONS

Nanolab, "Carbon Nanotube—Carbon Fiber Veil Composite," Apr. 4, 2011, 2 pages, retrieved from http://web.archive.org/web/20110714154717/http://www.nano-lab.com/isg-product.html.

Gou J. et al., "Carbon nanofiber paper for lightning strike protection of composite materials," Composites Part B: Engineering, Elsevier, UK, vol. 41, No. 2, Mar. 1, 2010, pp. 192-198.

* cited by examiner

NANOREINFORCED FILMS AND LAMINATES FOR AEROSPACE STRUCTURES

FIELD OF THE INVENTION

The present invention relates to surface films and laminates for use in aerospace structures, and in particular to nanoreinforced films and laminates for aerospace structures with enhanced properties.

BACKGROUND OF THE INVENTION

Aerospace designers must balance several factors in the design of structures and components. Designers appreciate the complex interplay between weight, strength, costs, material properties, environmental conditions and the multitude of service requirements for various components. First, aircraft components must be lightweight to ensure fuel economy, but strong enough to meet structural and performance requirements. Hence, composite structures often are selected due to their sturdiness and low weight densities. Second, the environment in which these structures operate also requires erosion resistance, as aerospace structures are exposed to impact by rain, sand, ice, hail and other foreign objects. These objects can degrade surface finish and create abrasion, which can result in high drag coefficients, which contributes to reduced fuel economy for the aircraft on which they are used. Third, the changes in altitude and temperature differentials during operation of an aircraft subject the aircraft's components to extreme thermal cycling that can cause microcracking. Fourth, long term exposure to sunlight and ultraviolet (UV) radiation can degrade the properties of aircraft components. Finally, the possibility of lightning strikes requires consideration of the electrical conductivity of external components. In order to meet performance requirements and extend performance life, designers must properly plan for and design structures and materials to function under these varied conditions.

Coatings and/or film laminates are often applied to the external surface of aerospace structures to assist in meeting the component's operational requirements. However, many of the commercially available films and coatings often exhibit acceptable properties for one design factor at the expense of one or more other factors. For example, a newly designed film may provide superior erosion resistance but at the expense of degraded UV resistance and/or lightning strike protection.

There is a need, therefore, for an improved film and laminate for use in aerospace applications that optimally addresses the multitude of needs imposed by operational and environmental conditions. Examples of aerospace structural components that can benefit from improved film and laminates include wings, fuselage, tails, nacelles, rotary blades, as well as other component parts.

SUMMARY OF THE INVENTION

The following presents a simplified summary of the invention in order to provide a basic understanding of some aspects of the invention. This summary is not an extensive overview of the invention and is not intended to identify key or critical elements of the invention or to delineate the scope of the invention. The purpose of this section is to present some concepts of the invention in a simplified form as a prelude to the more detailed description that is presented later.

A composite laminate for use on an external part of an aerospace vehicle has improved ultraviolet resistance and resistance to microcracking from thermal cycling. The laminate comprises a nanoreinforcement film, a support veil, and a composite layer. The laminate also can have a lightning strike protection layer and an external paint and primer. The nanoreinforcement film can comprise carbon nanomaterial and a polymer resin, and the composite layer has one or more layers of a reinforcement and a polymer resin. The carbon nanomaterial can be carbon nanofibers, and the nanoreinforcement film can have an areal weight of less than about 100 g/m2. The carbon nanomaterial can also comprise carbon nanofibers and carbon nanotubes.

DETAILED DESCRIPTION

Certain exemplary embodiments of the present invention are described below and illustrated in the accompanying figures. The embodiments described are only for purposes of illustrating the present invention and should not be interpreted as limiting the scope of the invention. Other embodiments of the invention, and certain modifications and improvements of the described embodiments, will occur to those skilled in the art and all such alternate embodiments, modifications, and improvements are within the scope of the present invention.

Figure 1A:
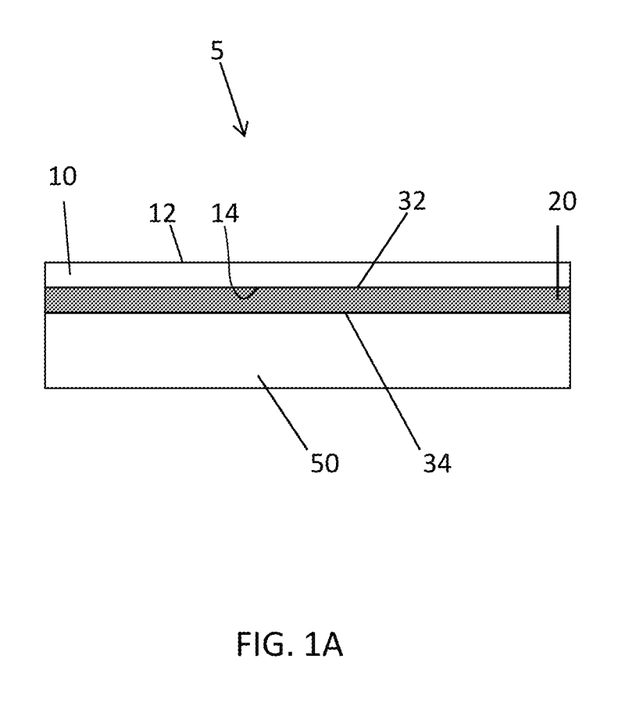
FIGS. 1A, 1B and 1C show composite laminate lay-up constructions (or assemblies) according to embodiments of the invention.
Figure 1B:
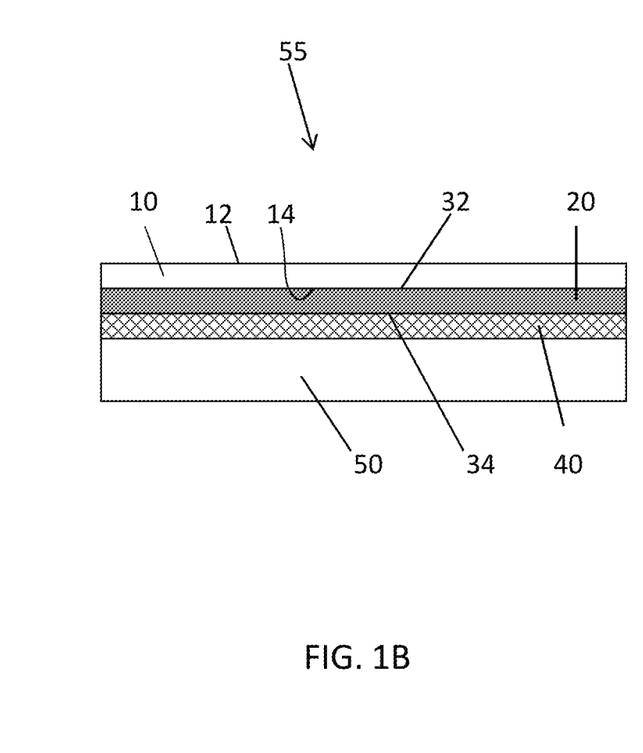
Figure 1C:
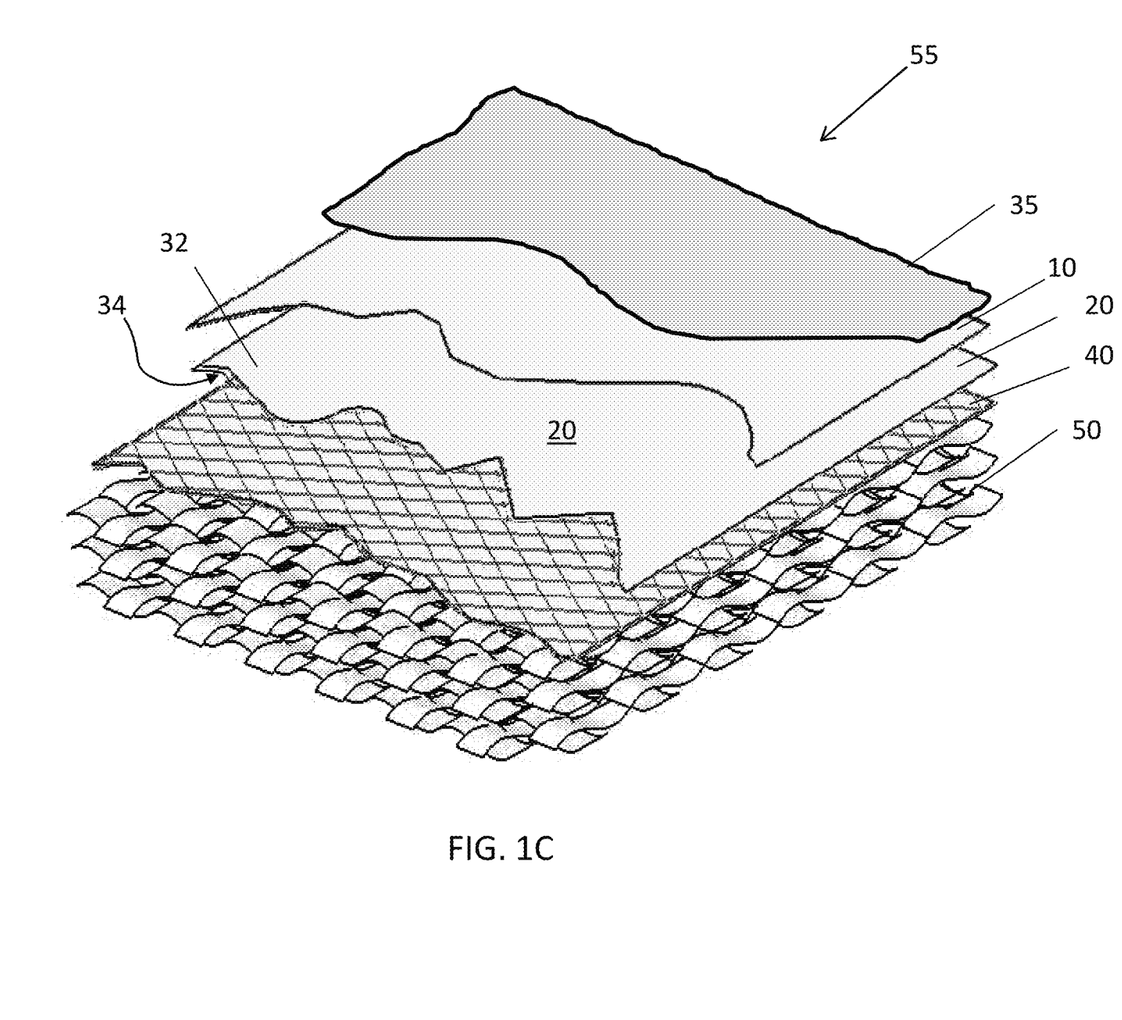

FIG. 1A shows a composite laminate 5. This figure shows a laminate lay-up construction or assembly of one embodiment. Laminate 5 includes a layer of a nanoreinforced film 10, a support veil 20, and a composite layer 50. FIG. 1B shows a composite laminate 55 according to another embodiment of this invention. FIG. 1B shows a laminate lay-up construction or assembly, and includes an optional lightning strike layer 40. FIG. 1C shows a perspective, cut-away view of a composite laminate 55, with a nanoreinforced film 10, a support veil 20, lightning strike layer 40 and a composite layer 50. The support veil 20 has opposing sides 32 and 34, with the side 34 lying adjacent to the composite layer 50 in FIG. 1A, and adjacent to the lightning strike layer 40 in FIGS. 1B, 1C. FIG. 1C also shows an optional paint layer or layers 35.

The nanoreinforced film 10 of the embodiments shown in FIGS. 1A and 1B can form the outer surface of an external part of an aerospace vehicle such as an aircraft. The nanoreinforced film 10 has first side 12 and second side 14, where the first side 12 can form a portion of the outer surface of an external part. An external part, as used herein, means any component that is exposed to the environment during service in flight or on the ground. The external part can include, but is not limited to, aircraft components such as a fuselage, empennage, wing, engine or nacelle, vertical tail, rotor blade, including any components or portions thereof. The external part can also include, without limitation, other non-aircraft components that have similar functional or performance features, such as wind turbine blades.

The nanoreinforced film 10 can include without limitation nanomaterials and a polymer resin. Nanomaterials, such as carbon nanotubes, carbon nanofibers, nanosilicates, nano-aramid and nano-alumina, impart multifunctional attributes to the films, such as lower weight densities, higher strengths, higher erosion and abrasion resistance, higher thermal conductivity, higher thermal cycling resistance and higher UV resistance. In one embodiment, the nanomaterials used in the formation of the nanoreinforced film 10 are carbon nanofibers having an average diameter of about 60 to about 300 nanometers (nm) and an average length of about 30 micrometers (μm) to about 50 millimeters (mm). In one example, the carbon nanofibers have a diameter of about 150 nm and a length of about 10 millimeters (mm). The percentage of carbon nanofibers in the nanoreinforced film 10 can be up to about 8% by weight. In another embodiment, the amount of carbon nanofibers can be up to about 20% by weight, with the preferred amount dependent upon the viscosity of the starting selected resin and the preferred viscosity of the resin with the nanoreinforcement. When the resin comprises other nano-particles in addition to the carbon nanofibers, the amount of carbon nanofibers can be decreased. When the resin viscosity is low at about 500 cP, the amount of nanoreinforcements can be higher up to about 20% by weight.

In another embodiment, the nanomaterials used in the formation of the nanoreinforced film 10 can also include carbon nanotubes in addition to the carbon nanofibers. The relative amounts of carbon nanofibers and nanotubes can be varied. In one example, the carbon nanotubes are multi-walled carbon nanotubes (MWCNTs). The MWCNTs can comprise between about 0.2% to about 0.7% by weight of the film. A relatively low percentage of MWCNTs is preferred since the addition of MWCNTs can increase the viscosity of the resulting carbon nanotubes/carbon nanofibers/polymer resin mix during formation of the nanoreinforced film 10. In one example, MWCNTs preferably comprise about 0.5% by weight of the film, with a preferred range of between about 0.2% to about 0.5% by weight of the film. The MWCNTs have a diameter between about 5 nm and about 100 nm, and an average length of between about 0.5 micrometers (μm) and about 5 millimeters (mm). In an example, the MWCNTs have an average diameter of about 9.5 nm and an average length of about 1.5 μm. In other embodiments, the carbon nanotubes can be single-wall carbon nanotubes, or a mixture of MWCNTs and single-wall carbon nanotubes.

Either one or both of the carbon nanotubes or nanofibers can be functionalized prior to film formation. Functionalization can occur, for example, by heat-treating the fibers in a controlled atmosphere containing ozone, in a process referred to as ozonolysis. An exemplary functionalization process is described in U.S. Patent Application Publication No. 2009/0186214, which is incorporated herein by reference.

In one embodiment where both carbon nanofibers and nanotubes comprise the nanomaterial, the nanomaterial can comprise up to about 10% by weight of the nanoreinforced film 10. In another embodiment, the carbon nanofibers and nanotubes comprise up to about 8% by weight of the nanoreinforced film 10. In yet another embodiment, the carbon nanofibers and nanotubes comprise up to about 5% by weight of the nanoreinforced film 10.

As stated above in one example, the nanoreinforced film 10 can comprise carbon nanotubes, carbon nanofibers, and a polymer resin. The polymer resin in one embodiment is a toughened epoxy resin. Epoxy resin is preferable for use in aerospace composite components as it provides an excellent combination of performance attributes desired for these structures, including but not limited to high strength to weight ratio, damage tolerance, environmental resistance and durability. In alternative embodiments, other resins can be used, such as polyimides, bismaleimides, polyamides, benzoxazines, polyesters, vinylesters, bismaelimides, phenolics, and cyanate esters. The formation of the carbon nanomaterial and polymer resin into the nanoreinforced film 10 is further described below.

Once formed, the nanoreinforced film 10 can have an areal weight between about 40 $g/m^2$ and about 400 $g/m^2$. In one example, the nanoreinforced film 10 has an areal weight of less than about 100 $g/m^2$. In another example, the nanoreinforced film 10 has an areal weight of less than about 150 $g/m^2$.

A support veil 20 is combined with the nanoreinforced film 10 for support and to limit stretching or tearing of the nanoreinforced film 10 during the lay-up process. The support veil 20 also adds dimensional stability and provides superior cured ply thickness control to the nanoreinforced composite laminates 5 and 55. The support veil 20 can provide a smooth covering for bulk carbon composite structures and add stiffness with minimal weight gain. As shown in FIGS. 1A-1C, the support veil 20 has opposing sides 32 and 34, with the side 34 lying adjacent to the composite layer 50 in FIG. 1A, and adjacent to the optional lightning strike layer 40 in FIGS. 1B, 1C. The support veil 20 in one embodiment is a nonwoven mat of carbon fibers and a binder. The nonwoven mat is preferably a nonwoven material formed from chopped fibers, such as Optimat, available from Technical Fibre Products. Most preferably the chopped fibers are carbon fibers. The binder can comprise about 5% by weight of the support veil. In one embodiment, the binder can be a polyvinyl alcohol (PVA) binder. Other polymeric binders can be used in the support veil as needed. The support veil 20 can have an areal weight of between about 3 $g/m^2$ and about 50 $g/m^2$. In one embodiment, the support veil 20 is a carbon veil with an areal weight of less than about 10 $g/m^2$. The support veil does not carry structural load unlike heavier fabrics (with areal weights typically greater than about 70 g/m2) used in conventional load-bearing composite structures, such as composite layer 50 below.

In one embodiment, the nanoreinforced film 10 and support veil 20 can be combined in such a way that no interface between the nanoreinforced film and support veil is observable. That is, the nanoreinforced film 10 and support veil 20 can form a single layer material. In this embodiment, the support veil is preimpregnated with the carbon nanomaterial and the polymer resin mixture serving as the matrix such as in conventional prepreg processing technology known in the art that will result in a seamless single layer film.

Continuing with FIGS. 1A-1C, the composite layer 50 in a preferred embodiment can include a carbon fabric reinforcement impregnated with an epoxy resin. The composite layer 50 can be formed from any reinforcement, however, such as a braid, knit, woven, non-woven, unidirectional fiber tow, or other known reinforcement configurations, and combinations thereof. Such reinforcements typically have areal weights of greater than about 70 $g/m^2$. In addition, the composite layer 50 can be formed of one or more reinforcement layers; e.g., two, three, four or more layers. In alternative embodiments, resins such as epoxies, polyimides, bismaleimides, polyamides, benzoxazines, polyesters, vinylesters, bismaelimides, phenolics, and cyanate esters can be used.

As shown in FIGS. 1B 1C, the composite laminate 55 can include an optional lightning strike layer 40 between the support veil 20 layer, and the composite layer 50. In an alternative embodiment, the lightning strike layer 40 can be placed between the film 10 and support veil 20. Various substrates can be used for the lightning strike layer 40. For example, an expanded metallic sheet or mesh (e.g., formed from aluminum, copper, bronze, nickel or silver), a metal fabric (e.g., formed from copper, bronze, aluminum, nickel or silver), or composite fabric as described in U.S. Patent Application Publication No. 2009/0186214, which is incorporated herein by reference. Where aluminum is used as the lightning strike layer 40, the support veil 20 is preferably a polyester veil. In addition, a composite layer (not shown in FIG. 1B or 1C) comprising glass fibers preimpregnated with epoxy resin is preferably placed directly adjacent and beneath the surface film to minimize galvanic corrosion of the aluminum.

Airworthiness certification authorities have established standards for lightning strike protection for various types of aircraft and aircraft components. Providing a lightning strike layer 40 allows aircraft and aircraft components to meet such standards so that electrical energy generated by such a strike are appropriately dissipated to avoid substantial damage. Unfortunately, the provision of a metal screen in the conventional lightning strike layer can contribute to differences in thermal expansion characteristics for the laminate structure, which can lead to microcracking. Using the nanoreinforced film 10 with the support veil 20 layer, can minimize, if not eliminate microcracking that can result with use of metallic lightning strike layer 40, as will be discussed below.

For the composite laminate 5, 55, the external surface 12 may be subsequently and optionally coated with a paint layer 35 (which may include an optional primer layer) as shown in FIG. 1C.

Figure 2:
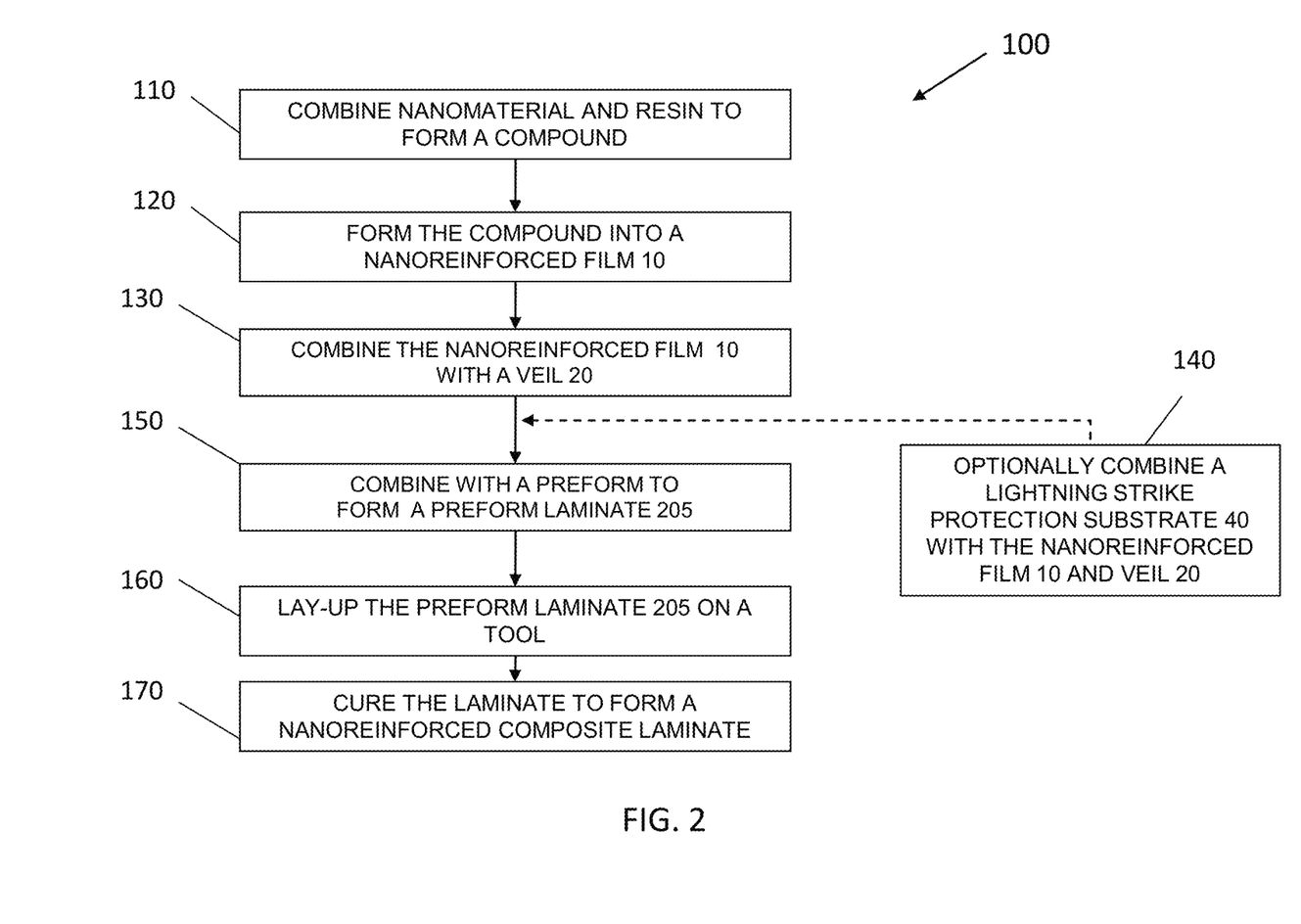
FIG. 2 is a diagram illustrating a method of making composite laminates as described herein.

Turning now to FIG. 2, a process 100 of fabricating the nanoreinforced composite laminates 5 and 55 is shown. Initially, in step 110 the carbon nanomaterials and resin are mixed together. In one embodiment, these materials are mixed together in a compounding apparatus, such as a combination blade-type mixer and extruder, as is known in the art. Each material in the compound can be introduced to the compounding apparatus separately. The epoxy resin can be introduced first, followed by the nanomaterials and other additives. Where the carbon nanomaterials include both carbon fibers and carbon nanotubes, these ingredients can also be introduced to the compounding apparatus separately, or pre-mixed along with a catalyst, as is known in the art. A description of suitable catalysts are set forth in U.S. Pat. No. 4,822,832, and B. Dao, et al., *Accelerated Aging Versus Realistic Aging in Aerospace Composite Materials. II. Chemistry of Thermal Aging in a Structural Composite*, CSIRO Molecular and Health Technologies, Journal of Applied Polymer Science, Vol. 102, 3221-3232, Wiley Periodicals, Inc., (2006), both of which are herein incorporated by reference. In one embodiment, the epoxy matrix of both tetraglycidyldiaminodiphenylmethane (TGDDM) and a triglycidylparaaminophenol (TGAP) cured by a mixture of 3,30 and 4,40-diaminodiphenyl sulfone can be used. The epoxy may also contain a toughening agent, which may be a polysulfone thermoplastic.

Continuing with FIG. 2, as shown in step 120, the compound can be formed into a nanoreinforced film 10 having the desired areal weight using an extruder under operating conditions known in the art.

As shown in step 130, the nanoreinforced film is combined with the support veil 20. In one embodiment, the nanoreinforced film 10 is infused with the support veil 20 via roll-compaction film transfer, such as in conventional film transfer prepreg technology as is known in the art.

Optionally, as shown in step 140, the nanoreinforced film 10 and support veil 20 can be combined with a lightning strike layer 40. The lightning strike layer 40 can be positioned adjacent to the support veil 20, and can also be assembled using conventional film transfer prepreg technology as known in the art. Alternatively, the lightning strike layer 40 can be positioned adjacent the support veil 20 layer during the heating and curing processing as described below.

Figure 3:
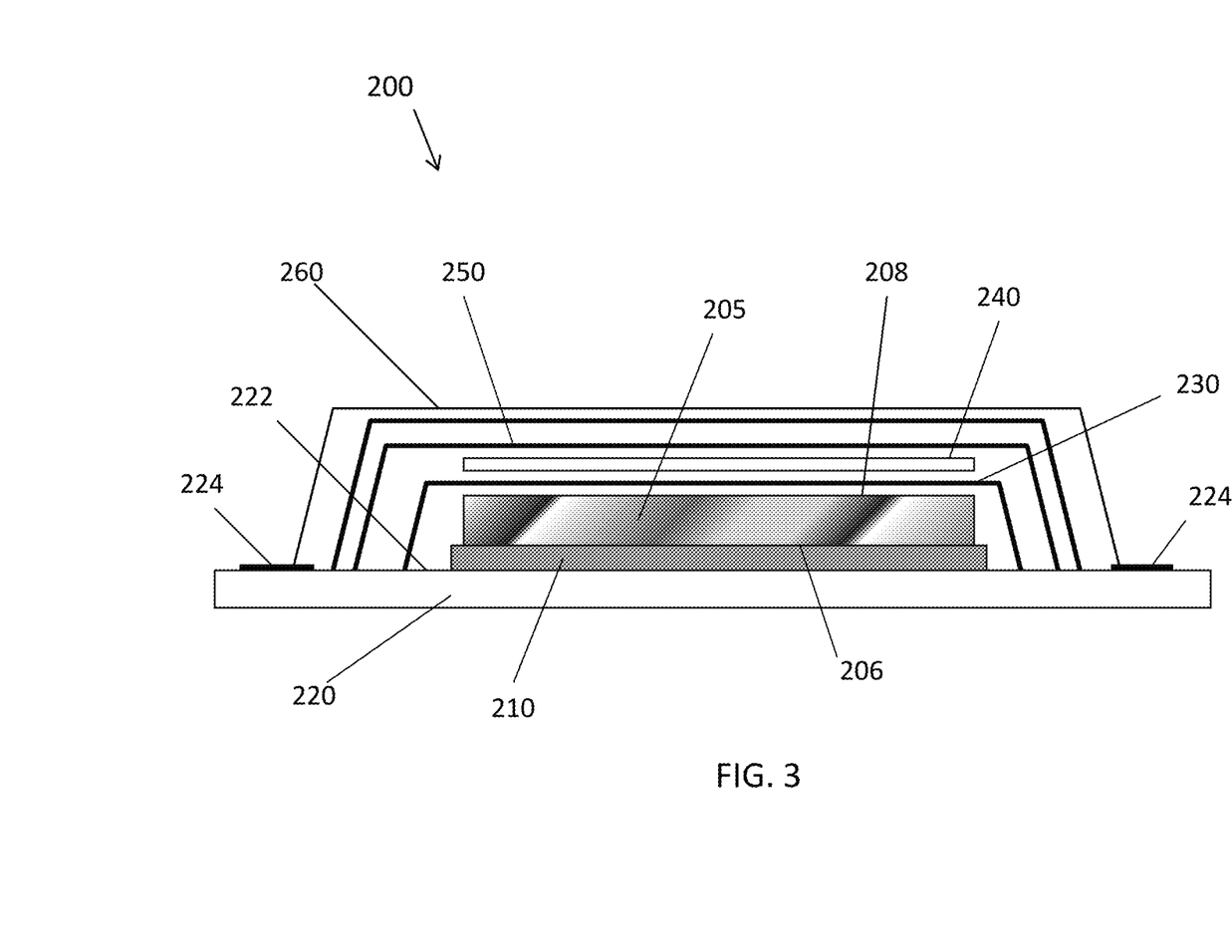
FIG. 3 is a schematic that illustrates a lay-up and assembly for forming a composite laminate as described herein.

As shown in step 150, the nanoreinforced film 10 and support veil 20 can be combined with a preform (which when cured becomes the composite layer 50 described above) to form a preform laminate 205 (as shown in FIG. 3). Conventional methods to combine the nanoreinforced film 10, support veil 20, and preform can be used, as is known in the art. The nanoreinforced film 10 and support veil 20 (either as separate films or as a single film that has been prepregged as described above) can be applied to either side of a dry perform. Thereafter, the combination can be consolidated through hot rollers as is known in the art. Alternatively, the preform can be formed through a resin infusion process as known in the art, and then combined in a hand lay-up process with the nanoreinforced film 10 and support veil 20, followed by curing in an autoclave as discussed below.

As shown in FIG. 2, step 160 includes placing a preform laminate 205 on a tool for further processing. A schematic of a lay-up assembly 200 including preform laminate 205 according to one embodiment of the present invention is shown in FIG. 3.

In step 170, the lay-up assembly 200 (FIG. 3) is placed in conventional composite processing equipment, such as an autoclave, to cure the preform laminate 205 and form a composite laminate 5 or 55 (FIGS. 1A and 1B). During step 170, the polymer resins in the nanoreinforced film 10 and the preform are cured. Thus, step 170 can cure both the epoxy resin that is combined with the carbon nanomaterials (comprising of one or both nanofibers and carbon nanotubes) to form the nanoreinforced film 10, and the additional epoxy resin on the preform that forms the composite layer 50. When the first and second polymer resins are the same (e.g., both are epoxy), the preform laminate can be exposed to temperatures of up to about 350 degrees F., and pressures of up to about 100 psig for times sufficient to cure the polymer resins. Higher temperatures and pressures are sometimes required depending upon the resin used. For example, polyimides usually have a higher cure temperature of about 600 degrees F. to about 700 degrees F. and pressures up to about 200 psig. The cured laminate is then cooled and the composite laminate part is removed from the lay-up assembly 200 (FIG. 3).

FIG. 3 shows the lay-up assembly 200 according to one embodiment of the present invention. The lay-up assembly 200 can include use of a peel-ply material 210 placed directly on a tool 220. The preform laminate 205 includes a first side 206 that has the nanoreinforced film 10 thereon, and a second side 208. The first side 206 of the preform laminate 205 is placed on the peel-ply 210. The peel-ply 210 facilitates removal of the preform laminate 205 from the tool 220 upon completion of a curing step further detailed below.

A non-permeable release film 230 can be placed over the preform laminate 205, followed by an optional caul sheet 240. A permeable substrate 250, such as an expanded fiberglass (non-woven or woven) that helps create a bleed path for porosity to be removed during curing, is placed over the peel-ply 210, preform laminate 205, non-permeable release film 230, and the optional caul sheet 240. The ends of the permeable substrate 250 and non-permeable release film 230 are combined on the tool surface 222. A vacuum barrier 260 is then placed over the assembly and sealed to the tool surface 222 via vacuum seal 224. The above described processing is intended to illustrate merely one method of forming the composite laminate disclosed herein. Alternative manufacturing methods other than the hand lay-up described above also are available, including resin film infusion (RFI), resin transfer molding (RTM), and other processes that are suitable for the intended end use of the nanoreinforced film and laminate and are well known to those skilled in the art.

While the nanoreinforced film 10, support veil 20, composite layer 50, optional lightning strike layer 40 and optional primer and paint layer 35 have been shown and described above in relation to their position adjacent one another, this disclosure includes composite structures where the layers are juxtaposed differently. For example, a lightning strike layer 40 can be positioned between the nanoreinforced film 10 and support veil 20, instead of the configuration shown in FIG. 1B. Fabrication of such structures where the aforementioned layers can be re-positioned will occur as set forth above and consistent with known assembly methods.

The combination of the nanoreinforcements and the support veil provides improved UV and thermal cycling performance, among other favorable qualities. Tables 1 and 2 below support and illustrate the improved UV protection provided by the nanoreinforced film and laminates as described herein.

UV exposure evaluation was conducted using standard procedures specified in ASTM G-155, Standard Practice for Operating Xenon Arc Light Apparatus for Exposure of Non-Metallic Materials, 10.1520/G0155-05A. This standard sets forth methods for using zenon arc light intended to reproduce the weathering effects that occur when materials are exposed to sunlight in actual use. Tests specimens (identified in Table 2) were exposed to filtered xenon arc light under controlled environmental conductions. Additional parameters pertinent to the tests are as follows:

UV Source: Xenon Arc Exposure

Spectral Irradiance: 0.35 W/m2 at a wavelength of 340 nm

Black panel temperature: 63±2.5° C.

Exposure cycle: 102 minutes of light exposure, followed by light and water spray for 18 minutes Total exposure time: 3000 hours, with monitoring every 500 hours.

Table 1 indicates a degradation scale used to determine UV performance:

TABLE 1

UV Degradation Scale

| Level | Description of UV Degradation of Coating |
| --- | --- |
| Level 0 | No change from unexposed coating |
| Level 1 | Change in color or gloss, but no pitting or erosion |
| Level 2 | Isolated pitting with little to no erosion |
| Level 3 | Moderate pitting and erosion |
| Level 4 | Heavy systemic pitting with substantial erosion |
| Level 5 | Severe pitting and complete erosion of coating |

Table 2 shows relative improvement in UV resistance that the nanoreinforced film of Samples 2 and 3 formed as described has compared to a film lacking nanoreinforcements (Sample 1) and to various prior art or conventional surfaces films. The makeup of each sample is shown in the Table.

TABLE 2

UV RESISTANCE TEST RESULTS

| Film | Degradation Level Before Exposure (from Table 1) | Degradation Level After 2500 hours exposure (from Table 1) | Degradation Level After 3000 hours (from Table 1) |
| --- | --- | --- | --- |
| Sample 1: Epoxy NSF 1-Surface Film with embedded expanded copper screen mesh, support veil and no nanoreinforcements; Resin with 0% NanoFibers (CNF) and 0% Carbon Nanotubes (CNT) | 0 | 5 | 5 |
| Sample 2: NSF 2-Surface Film with embedded expanded copper screen mesh and reinforced with CNFs and CNTs and with carbon support veil. Resin with 4 wt. % CNF and 0.5% CNT | 0 | 2 | 2 |
| Sample 3: NSF3-Surface Film with embedded expanded copper screen mesh and reinforced with CNFs, CNTs, Aramid and alumina and with carbon support veil. Resin with 4 wt. % CNF, 0.5% CNT, 2% Aramid and 2% nano-alumina | 0 | 2 | 2 |

TABLE 2-continued

UV RESISTANCE TEST RESULTS

| Film | Degradation Level Before Exposure (from Table 1) | Degradation Level After 2500 hours exposure (from Table 1) | Degradation Level After 3000 hours (from Table 1) |
|---|---|---|---|
| Conventional Film 1 | 0 | 5 | 5 |
| Conventional Film 2 | 0 | Not available | 5 |
| Conventional Film 3 | 0 | Not available | 5 |
| Conventional Film 4 | 0 | Not available | 5 |
| Conventional Film 5 | 0 | Not available | 5 |

Various samples also were tested for resistance to thermal cycling for various nanoreinforced composite laminates. Eight (8) separate laminates were tested to determine the amount of microcracking in comparison with a conventional surface film. Thermal cycling tests were conducted using the following procedures:

1.1 Place the honeycomb panel in a humidity chamber and condition for 12 hours minimum at 120°±5° F. and 95% relative humidity.
1.2 After the initial conditioning, discontinue the humidity control and decrease the temperature to −65° F. Hold for 60 minutes minimum.
1.3 Thermally cycle panels for 30±5 minutes from −65°±5° F. to 160°±5° F., holding the temperature constantly for three minutes at each temperature limit.

Continue in this manner for 400 cycles minimum and then return the chamber to 75°±5° F.

1.4 Remove the test panels from the chamber. Apply a fluorescent dye to the film surface. Examine the treated panels under black light and at up to 2× magnification to check for cracks. Record the crack rating scale.
1.5 Repeat the steps described in Paragraphs 3.5.13.1 through 3.5.13.4 for a total of five cycling blocks.

Remove panels after each cycling block and examine for cracks and other damage.

Figure 4:
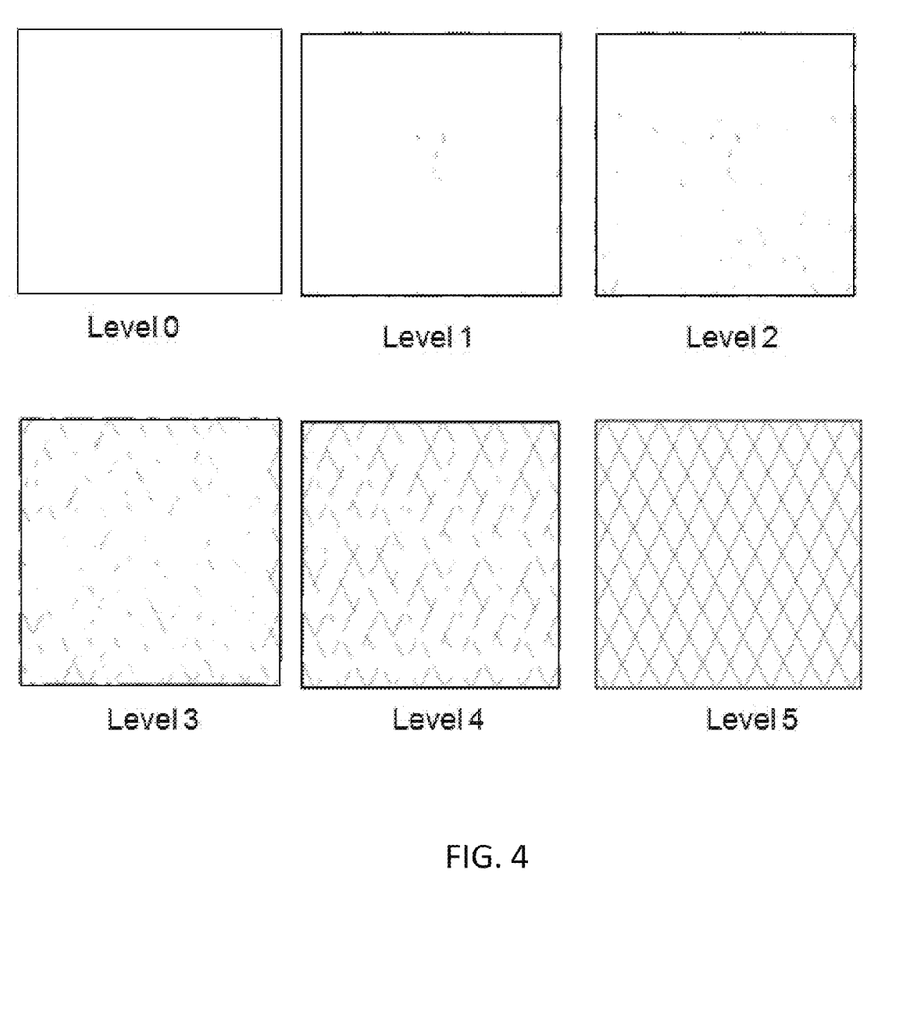
FIG. 4 illustrates levels of degradation during performance testing of composite laminates as described herein.

TABLE 3 contains the thermal cycling degradation scale used for evaluation purposes and FIG. 4 shows graphically a demonstrative representation of the various cracks equating to the levels shown in TABLE 3. Film samples for the thermal cycling tests are labeled TC1 through TC9, and contain the percentage of nanomaterial as set forth in TABLE 3. The use of support veil and lightning strike layer in the film samples also is shown.

TABLE 3

THERMAL CYCLING DEGRADATION SCALE

| Level | Thermal Cycling Degradation Description |
|---|---|
| Level 0 | No change |
| Level 1 | Few isolated cracks |
| Level 2 | Many isolated cracks |
| Level 3 | Moderate systemic cracking |
| Level 4 | Heavy systemic cracking |
| Level 5 | Severe systemic cracking |

TABLE 4

THERMAL CYCLING MICROCRACKING

| Sample | Nanoreinforced Film (% by weight) | Support Veil | Lightning Strike Layer | Degradation Level (from TABLE 3 and FIG. 4) |
|---|---|---|---|---|
| TC1 | Carbon NanoFibers (CNF) (4%) | None | Expanded bronze mesh screen | 5 |
| TC2 | CNF (4%) | None | Woven bronze wire | 5 |
| TC3 | CNF (4%) | Carbon | Expanded bronze screen | 1 |
| TC4 | CNF (4%) | Carbon | Woven Wire | 0 |
| TC5 | CNF (4%) & Carbon Nanotubes (CNT) (0.5%) | Carbon | Expanded bronze screen | 0 |
| TC6 | CNF (4%) & CNT (0.5%) | None | Woven bronze wire | 5 |
| TC7 | CNF (4%) & CNT (0.5%) | Carbon | Expanded bronze wire | 0 |
| TC8 | CNF (4%) & CNT (0.5%) | Carbon | Woven bronze wire | 0 |
| TC9 | None | Polyester | Expanded Bronze screen | 2 |

As shown in TABLE 4, samples TC3, TC4, TC5, and TC7 all demonstrate superior resistance to microcracking as compared to the convention film of TC8. Moreover, the absence of a support veil of samples TC1 and TC2 reveal significantly high microcracking, which demonstrates the improved performance achieved with the use of the support veil as herein described. The superior results above are believed to result due to the positive effects upon the coefficient of thermal expansion of the composite caused by the nanoreinforcements.

All samples shown in TABLE 4 contained a lightning strike layer 40. Test conducted (not included in TABLE 4) without a lightning strike layer 40 revealed no microcracking, as the microcracking is believed to be due to thermal expansion mismatch between the metal of the lightning strike layer 40 and the resin.

The composite laminate part can be used on various external components, and are particularly well suited for aircraft components such as fuselage, wings, engine and nacelle, pylons and vertical and horizontal stabilizers. In other embodiments, the composite laminate part can form the leading edge of the inlet lip and cowl of an engine nacelle, the leading edge of the horizontal and vertical stabilizers of the tail, and the leading edge of the wing. Further, composite laminates as described herein are well suited for use on the surface of acoustic structures of the type described in U.S. Pat. No. 7,921,966. The laminates described herein can be readily perforated and tuned for desired noise-attenuation and can have a surface finish to facilitate smooth laminar air flow. Such structures can be manufactured for a 360-degree linear acoustic liner for optimal inner barrel performance.

The nanoreinforced composite laminates as described herein provide a favorable surface finish to an aircraft part, improved UV protection, erosion protection, resistance to microcracking from thermal cycling, and abrasion resistance. Use of such a composite laminate for external aircraft parts has been found to eliminate additional surface finishing that might otherwise be required to provide the stated combination of properties. In installations where additional surface treatment is nonetheless desired, the external surface 12 may be subsequently and optionally coated with a primer and paint layer 35 as shown in FIG. 1C.

The above descriptions of preferred embodiments of the invention are intended to illustrate various aspects and features of the invention without limitation. Persons of ordinary skill in the art will recognize that certain changes and modifications can be made to the described embodiments without departing from the scope of the invention. All such changes and modifications are intended to be within the scope of the appended claims. Features from one embodiment or aspect may be combined with features from any other embodiment or aspect in any appropriate combination. For example, any individual or collective features of aspects or embodiments may be applied to apparatus, product or component aspects or embodiments and vice versa.

We claim:

1. A composite laminate for use on an external part of an aerospace vehicle, the laminate comprising:
   a single-layer nanoreinforcement film comprising carbon nanomaterial, a polymer resin, and a support veil, wherein the support veil is preimpregnated with the carbon nanomaterial and the polymer resin, wherein the support veil is a nonwoven mat of carbon fibers and a binder, the support veil having an areal weight of less than about 10 grams per square meter; and whereby the single-layer nanoreinforecement film provides improved ultraviolet resistance to the composite laminate and resistance to microcracking from thermal cycling of the composite laminate;
   wherein the single-layer nanoreinforcement film comprises an areal weight of less than 100 g/m2;
   wherein the carbon nanomaterial comprises carbon nanotubes comprising less than 0.5% by weight of the single-layer nanoreinforcement film;
   a composite layer comprising one or more layers of a reinforcement and an additional polymer resin; and
   a lightning strike layer comprising a metal screen positioned between the singe-layer nanoreinforcement film and the composite layer.

2. The composite laminate of claim 1, wherein the carbon nanomaterial comprise carbon nanofibers.

3. The composite laminate of claim 1, wherein the carbon nanomaterial comprise carbon nanofibers and carbon nanotubes.

4. The composite laminate of claim 3 wherein the carbon nanotubes are multi-walled carbon nanotubes, and the carbon nanofibers comprise up to about 5% by weight of the nanoreinforcement film.

5. The composite laminate of claim 3, wherein the carbon nanotubes are multi-walled carbon nanotubes, and the carbon nanofibers comprise up to about 3% by weight of the nanoreinforcement film.

6. The composite laminate of claim 3, wherein the carbon nanofibers and nanotubes comprise about up to about 8% by weight of the nanoreinforcement film.

7. The composite laminate of claim 1, wherein the reinforcement is a braid, knit, woven, nonwoven, unidirectional fiber tow, or any combination thereof, the composite layer having an areal weight of at least 70 grams per square meter.

8. The composite laminate of claim 1, wherein the reinforcement is a woven carbon fabric, the additional polymer resin is an epoxy resin, the composite layer having an areal weight of at least 70 grams per square meter.

9. The composite laminate of claim 1, wherein the lightning strike layer comprises aluminum.

10. The composite laminate of claim 1, wherein the laminate provides resistance to UV absorption from sunlight, or in a laboratory environment with a xenon arc lamp ranging from 250 to 400 nm, 340 nm nominal wavelength for 0.35W/m2 exposure, with alternating light exposure and water spray, for up to 3000 hours.

11. The composite laminate of claim 1, wherein the nanoreinforcement film is the external, exposed layer of the external part of the aerospace vehicle.

12. The composite laminate of claim 1, further comprising one or more paint layers forming the external, exposed layer of the external part of the aerospace vehicle, the one or more paint layers being adjacent to the nanoreinforcement film.

* * * * *